Figure 1:
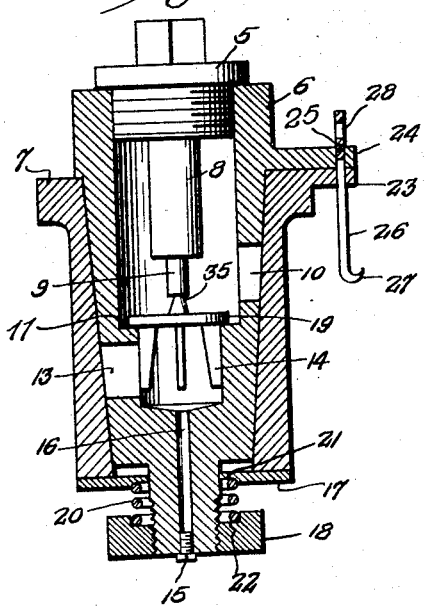

Nov. 2, 1926.   H. G. DUNLAP   1,605,332
REVERSIBLE CHECK VALVE AND CUT-OFF
Filed May 14, 1926

Inventor
H. G. Dunlap,
By Clarence A. O'Brien,
Attorney

Patented Nov. 2, 1926.

1,605,332

UNITED STATES PATENT OFFICE.

HARRY G. DUNLAP, OF CHICORA, PENNSYLVANIA.

REVERSIBLE CHECK VALVE AND CUT-OFF.

Application filed May 14, 1926. Serial No. 109,153.

The present invention relates to improvements upon the reversible check valve and cut off such as disclosed in Letters Patent No. 1,005,523 issued to me on October 10, 1911.

In the control of the flow of liquid, such as the piping of oil and in water distribution, it is very desirable in many cases to control the movement in either direction by a check valve, or to cut off the flow entirely. My patented valve structure solved this problem, in a practical and desirable manner, and my improvement relates to means for taking up the wear on the rotary portion of the valve structure and to afford more ready access to the check valve for the purpose of cleaning the same and unclogging the passage in the rotary valve, as becomes necessary from time to time in actual practice.

The invention contemplates the use of that form of valve in which a turning plug is made of a size large enough to contain a check valve and is capable of rotation, so as to permit the flow of liquid through it in either direction, and my improvement consists in providing resilient means for automatically taking up the wear on the turning plug and for allowing the check valve to be easily taken out of the plug when desired, and a further important object is to provide means for preventing the turning of the plug when the screw cap thereof is being removed and further in the provision of means whereby the plug may be locked against rotation by unauthorized persons, or in an accidental manner.

A still further very important object of the invention is to generally improve upon a valve structure of this nature by the provision of an exceedingly simple construction which may be manufactured at a reasonably low cost and yet will prove thoroughly reliable and efficient in operation, and strong and durable in use, and one which is not likely to get out of order, one which is compact and convenient, and otherwise well adapted to the purpose for which it is designed.

With the above and numerous other objects in view as will appear as the description proceeds, the invention resides in certain novel features of construction and in the combination and arrangement of parts as will be hereinafter more fully described and claimed.

In the drawings:—

Figure 2:
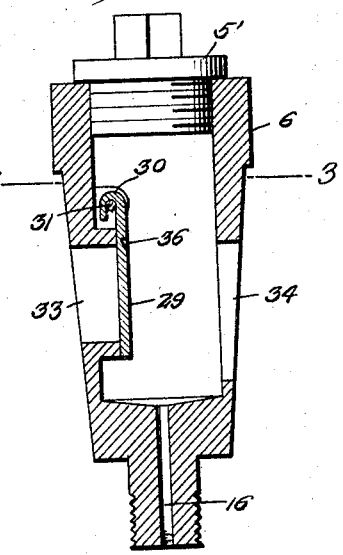
Figure 3:
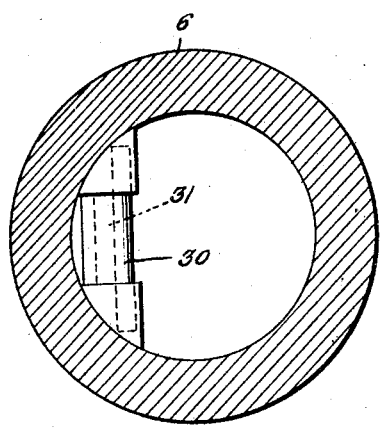
Figure 4:
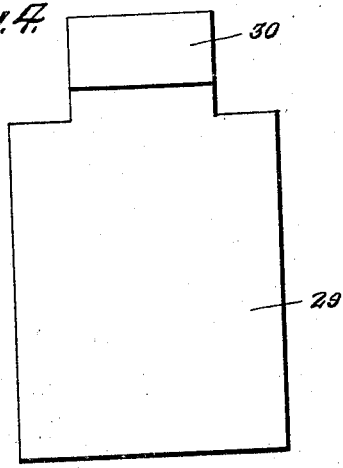

Fig. 1 is a transverse vertical section through the valve showing the valve closed, Fig. 2 is a vertical section through the valve plug showing another embodiment of the check, Fig. 3 is an enlarged detail section taken substantially on the line 3—3 of Fig. 2, and Fig. 4 is an elevational view of the check valve shown in Fig. 5.

Referring to the drawing in detail, it will be seen that the numeral 7 represents the outer casing. This casing is bored with a tapered hole to receive a tapered turning plug 6, which parts are fitted with a ground joint. The plug 6 is made hollow and has at the middle line, a circular shoulder 11 extending straight across and having a circular opening through it, to form a valve seat for a check valve 19, with a cylindrical chamber below it. This valve has depending from its lower side a plurality of lugs 14 that fit closely the cylindrical chamber below the valve seat, which lugs guide the valve as it moves up and down, and has also projecting from the top, a stem 9 which enters a tubular guide 8 in the cap 5.

In one side of the plug above the check valve is formed a port 10 and in the other side of the plug below the check valve is formed a port 13. Both of these ports, however, are within the range of communication with the vertically elongated openings (not shown) of the casing which communicate with the pipe.

The lower end of the plug extends through the bottom of the casing and has a central hole 16 through the same extending from the bottom of the valve chamber down through the end of the plug, where it is closed by a detachable screw stopple 15. The lower end of the plug is secured in a different manner from that shown in said Letters Patent, in that I utilize a washer 17, a nut 18 and a spring 20 which has its end convolutions seated in the recesses 21 and 22 provided respectively in the washer 17 and the nut 18, so that by threading this nut on the threads of the outer lower end of the plug, the nut will impinge against the spring in such a manner as to increase its tension, and thus the wear on the plug will be automatically taken care of.

At the upper end of the plug, it is squared to receive a wrench for turning it, and is also provided with a screw cap 5 which closes the top of the hollow plug. This screw cap and opening in the top of the plug are made large enough to permit the insertion and removal of the check valve through the same, and said screw cap is also formed with a downwardly extending tubular projection 8 that receives and guides the top of the valve stem. An important feature of my improvement includes the provision of a lug 23 projecting from the upper squared portion of the outer casing and the provision of a similar lug 24 on the upper outer portion of the rotatable or tapered plug 6. Both of these lugs 23 and 24 are provided with openings or slots 25. When the valve is closed as is shown in Fig. 1, the lug 24 is disposed over the lug 23 with the openings 25 registered.

When left in the position shown in Figure 1, these openings 25 of the lugs 24 and 23 register, so that the shank 26 of a tool may be passed therethrough. In the present instance, this tool has the lower end of its shank provided with a hook 27, the purpose of which will be brought out later, while the upper end thereof is provided with an opening 28 so that a seal may be engaged therewith, thus preventing the accidental or unauthorized removal of the shank from the openings 25, when the valve is closed.

In carrying out my invention, I do not confine myself to any particular form of check valve. Thus, for instance, instead of the valve shown in Fig. 1, I may use a hinged valve such as is shown in Figs. 2 to 4 inclusive. This hinge valve includes a plate body 29 having a hook 30 at the upper end thereof for rotatable engagement on a pin 31 so as to be closable over an opening 33 provided in one side of the tapered turning plug 6, which also has an opposite opening 34.

Particular attention is now directed to a very important feature of my invention, wherein I provide an annular shoulder 35 in the valve stem 9 and a notch 36 in the plate 29 so that when the caps 5 and 5' are removed, the implement 26 may be engaged with the shoulder 35 or the notch 36, so that either valve may be easily lifted out of the interior of the turning tapered plug. This is a very important feature because when the valve is closed, as shown in Fig. 1, it allows the interior thereof to be thoroughly cleaned, yet holding the line cut off. This becomes necessary from time to time owing to the fact that twigs clog up in the valve and also weights and the like, so that the check valve fails to function properly.

Another very important feature of the invention lies in the fact that the implement 26 may be used for preventing rotation of the plug when the cap 5 or 5' is being removed, as is desirable, thereby eliminating the necessity of using two wrenches which is very awkward.

It is thought that the construction, operation, utility, and advantages of this invention will now be clearly understood particularly when taken in conjunction with my patented structure referred to above. The present embodiments of the invention have been disclosed in detail merely by way of example, since in actual practice they attain the features of advantage enumerated as desirable in the statement of the invention and the above description.

It will be apparent that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

The combination of a casing, a tapered reversible turning plug extending through both the top and bottom of the casing and containing a chamber with a valve seat and opening through the top of the plug, and a check valve on said seat, a lug extending from the plug, a lug extending from the casing, said lugs having openings, a tool having a shank with a curved terminal, said shank being insertible through the openings when registered to prevent the turning of the plug in relation to the casing, said valve being provided with a recess so that the hooked end of the tool may be engaged therewith to facilitate removal of the valve from the chamber of the plug.

In testimony whereof I affix my signature.

HARRY G. DUNLAP.